United States Patent [19]
Yen

[11] 4,070,131
[45] Jan. 24, 1978

[54] TORNADO-TYPE WIND TURBINE

[75] Inventor: James T. Yen, Westbury, N.Y.

[73] Assignee: Grumman Aerospace Corporation, Bethpage, N.Y.

[21] Appl. No.: 542,421

[22] Filed: Jan. 20, 1975

[51] Int. Cl.² ........................... F03D 7/00; F03D 9/00
[52] U.S. Cl. .......................................... 415/3; 290/44; 290/55
[58] Field of Search ...................... 415/2–4, 415/164; 290/44,45, 54,55

[56] References Cited

U.S. PATENT DOCUMENTS

| | | | |
|---|---|---|---|
| 204,481 | 6/1878 | Cleland | 415/164 |
| 381,679 | 4/1888 | Devereux | 415/2 |
| 574,290 | 12/1896 | Twiss | 415/164 |
| 695,524 | 3/1902 | Woodell | 417/84 |
| 772,786 | 10/1904 | Clifford | 415/2 |
| 1,003,661 | 9/1911 | Shaffer | 415/2 |
| 1,112,203 | 9/1914 | Fandrey | 415/2 |
| 1,315,595 | 9/1919 | Clark | 415/4 |
| 1,474,571 | 11/1923 | Wiegolaski | 415/2 |
| 1,496,767 | 6/1924 | Bonetto | 415/2 |
| 1,545,633 | 7/1925 | Bender | 415/2 |
| 1,600,105 | 9/1926 | Fonkiewicz | 415/2 |
| 1,612,838 | 1/1927 | Schultz | 417/194 |
| 1,783,669 | 12/1930 | Oliver | 290/44 |
| 1,950,828 | 3/1934 | Thompson | 417/77 |
| 2,565,907 | 8/1951 | Bertin et al. | 417/77 |
| 3,063,223 | 11/1962 | Arbisi | 55/468 |
| 3,296,450 | 1/1967 | Johnson | 415/121 |
| 3,720,840 | 3/1973 | Gregg | 290/44 |

FOREIGN PATENT DOCUMENTS

| | | | |
|---|---|---|---|
| 23,282 | 5/1917 | Denmark | 415/2 |
| 46,956 | 9/1916 | Denmark | 415/198 |
| 1,086,320 | 4/1954 | France | 415/2 |
| 192,405 | 8/1923 | United Kingdom | 415/2 |
| 347,024 | 4/1931 | United Kingdom | 415/2 |
| 1,231,582 | 5/1971 | United Kingdom | 415/198 |

OTHER PUBLICATIONS

E. F. Lindsley, WindPower: How New Tech. is Harnessing an Age Old Energy Source, Pop. Science 54–59, 124–125 (July, 1974).

J. L. Smith, Jr. An Analysis of the Vortex Flow in the Cyclone Separation, J. of Basic Engr. 609–618. (Dec. 1962).

Primary Examiner—C. J. Husar
Attorney, Agent, or Firm—Morgan, Finnegan, Pine, Foley & Lee

[57] ABSTRACT

Atmospheric wind is admitted tangentially into a vertically extending structure and directed against the interior curved surface of the structure to produce vortex flow. The structure is open ended and spaced from ground or connected to a ram-air subterranean tunnel. The vortex flow and corresponding low pressure core draws ambient and/or ram air into the bottom of the structure to drive a horizontal turbine.

15 Claims, 4 Drawing Figures

TORNADO-TYPE WIND TURBINE

Present invention relates to wind turbines and more particularly to vortex flow induced wind turbines.

BACKGROUND OF THE INVENTION

The use of the wind to provide power for various uses including pumping and grinding dates back to the fifteenth century in Europe. In general, windmills provided mechanical work only on a limited scale for very local use.

With the ever increasing demands on energy sources, all possible sources are being researched. This is particularly true if the new source is (i) nonpolluting and inexhaustible, (ii) capable of supplying energy on a national scale, for example, exceeding 100,000 MW in capacity (the present U.S. electrical generating capacity is around 400,000 MW), (iii) relatively simple in technology so that it can be developed in a decade, and (iv) economically feasible so that the new power plant can compete with the existing or forthcoming fossil or nuclear power plants.

Wind energy has enough potential to qualify as such a new energy source. However, its energy density is low (its kinetic energy is equivalent to 15 watts per square foot cross-section at 15 mph) and it is highly fluctuating in speed and in direction, particularly near the ground.

The challenge is then to build wind energy systems of large unit size. Each unit can collect large amounts of wind to generate many megawatts of energy, can extend to great heights (e.g. several thousand feet above the ground) where wind is more steady and abundant, and can withstand the extreme winds of hurricanes and tornadoes.

For various reasons discussed below, the standard type windmill, i.e., a propeller assembly positioned to face the wind, has failed to meet this challenge. When adapted to drive an electrical generator, a standard windmill of more than 25 feet in diameter is needed to generate sufficient power for a single home. A long-range program is being pursued by the U.S. government to build a 125 feet diameter unit for generating 100 kilowatts. And the largest unit ever built generated only 1 megawatts with blades of 200 feet in diameter.

As to the standard windmill design it has significant drawbacks which make them undesirable for small energy production and unacceptable for large energy production.

These drawbacks fall into basically three categories: fluid dynamics, stress and electrical. The fluid dynamics difficulties may be best appreciated from a consideration of the Betz momentum theory. The column of air (wind) impinging on the windmill blades is slowed down, and its boundary is an expanding envelope. Disregarding rotational and drag losses, a theoretical maximum power output, due to the slowing of the wind and corresponding expansion of the boundary envelope, is approximately 60% of the power contained in the wind. Additionally, the structure used to support the blades of the windmill and the less than ideal performance of the blades themselves present interference losses further decreasing the power output.

Mechanical stresses induced on the blading and supporting structure present a further limitation, especially for large windmills. On the supporting structure, the axial stress, representing the force tending to overturn the stationary windmill, or the thrust on the bearing must be kept within limits at all wind speeds. To accomplish these results and to generate sufficient power, large diameter blades with built-in mechanisms for adjusting the pitch angles of the blades have to be utilized. The mechanisms make the blades fragile and costly.

Large diameter blades over 100 feet in diameter present significant dynamic stress problems when used in standard windmills. The combination of gravitation force and torque force on each blade element functions to cyclically stress the element as it rotates in a rising direction and then falling direction. Moreover, with vertically rotating blades, changes in median wind velocity and the specific wind velocity at different elevation along the path of the blade greatly influence the cyclical stresses and power output of the wind turbine.

Long blades supported at their roots and under the influence of the aforementioned oscillating forces are subjected to an increasingly severe and complex system of dynamic instabilities. It becomes increasingly difficult (and expensive) to safeguard against instabilities. Blade stiffness to weight ratio improvements and advanced design methods can help, but there will always be a practical maximum to the size of a conventional wind turbine.

Finally, wind turbines of the windmill type are not well suited for use in major power installations, particularly in power grids. In order to provide stability of the network, energy generators coupled to power grids must be maintained within critical voltage and frequency ranges and must be capable of furnishing the required amount of power whenever called upon by the grid dispatcher. The standard windmill is particularly sensitive to changes in median wind speed resulting in highly variable voltage, frequency or power output produced by the generators driven thereby. Moreover, large power output required for economic operation are not feasible due to stress problems; and difficulties arise in coupling the blade shaft, which rotates in the range of 20-100 rpm, with electric generators used in power grids which operate in the range of 600-3600 rpm.

SUMMARY OF THE INVENTION

The present invention overcomes many of the drawbacks of the standard windmill type wind turbine by utilizing a structure that operates on the principle of a tornado type vortex flow regime. This type of device is unlimited in size and can withstand the extreme winds of hurricanes or tornadoes.

The present invention (particularly, the preferred embodiment of the present invention) includes a stationary structure in which ordinary wind flow is transformed into a vortex. The structure is open at the top and bottom, and sides are comprised of a system of vertical vanes. The vanes in the direction of the wind are opened to admit the wind and direct it in a generally circular path around the interior of the structure. The circularity of flow and acceleration produces a laminar or turbulent flow vortex having a low pressure core.

The structure is raised from ground elevation so that the low pressure core draws ambient air into the bottom and through the structure. The vortex flow exits through the top of the structure for degradation in the atmosphere. The inertia of the rotating vortex partially overcomes and compensates for fluctuations in wind speed to enable a turbine, which is located within the structure, to be driven more uniformly. The turbine is positioned for rotation in a horizontal plane and is driven by the ambient air drawn into the bottom of the structure by the vortex. The vortex is driven along substantially the entire height of the structure and deceleration occurs downstream of the structure.

Cables are used to hold down the stationary structure to the ground. As a consequence, both the structure and the turbine may be built in large sizes sufficient for generating many megawatts of electricity, yet strong enough to withstand extreme winds of hurricanes or tornadoes.

An alternate embodiment, showing a different variation in tower shape and air inlet, is also specifically described in the present invention.

DETAILED DESCRIPTION OF A PREFERRED EMBODIMENT

Figure 1:
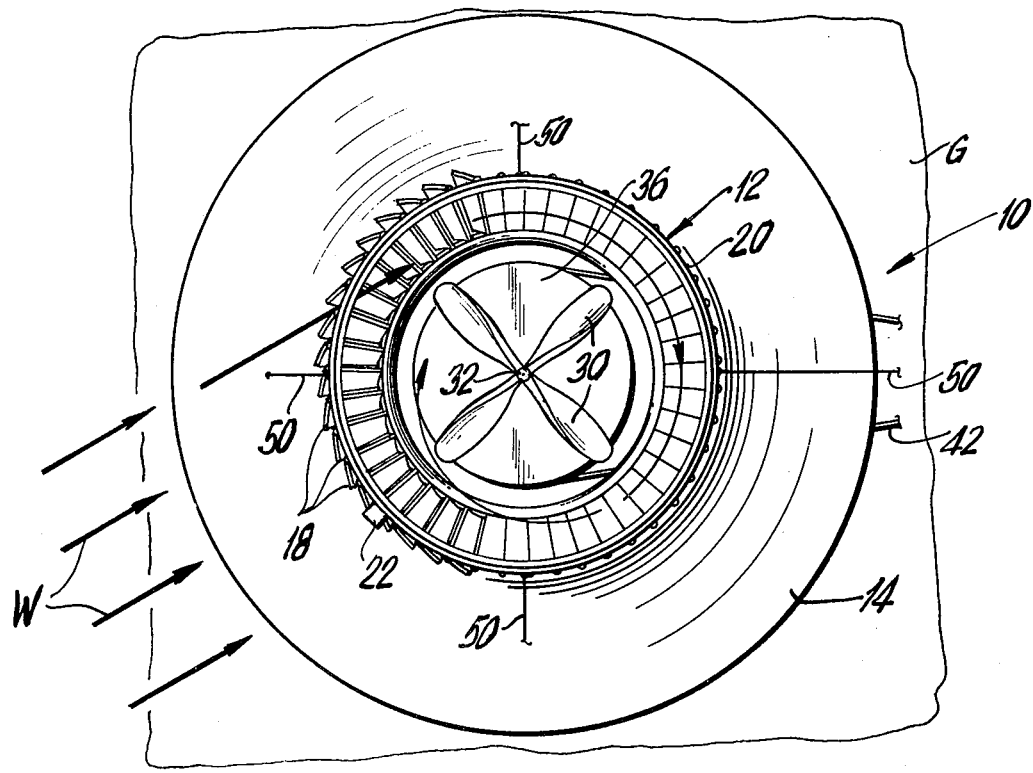
FIG. 1 is a schematic top plan view of a wind turbine device in accordance with the present invention in which the structure is generally hyperbolic in shape.

While this invention is susceptible of embodiment in many different forms, there is shown in the drawings and will hereinafter be described in detail a preferred embodiment of the invention, and alternatives thereto with the understanding that the present disclosure is to be considered as an exemplification of the principles of the invention and is not intended to limit the invention to the embodiments illustrated.

INTRODUCTION

Before proceeding with a description of the preferred embodiment, a short introduction to vortex flow will be presented to provide a clear understanding of the operation of this invention.

There are basically three different types of rotating flow regimes commonly referred to as a vortex. The first flow regime is rigid body rotation in which the fluid rotates as a solid body and the tangential velocity increases with radial distance from the center of rotation, as observed in flows where the viscous effect is dominant.

The second flow regime, laminar potential vortex includes the condition of negligible viscous effect. In this regime the tangential velocity will increase as radial distance decreases toward the center of rotation. When the circulation ($\Gamma = V_0R$) or Reynolds number ($Re = \Gamma/\nu$) is not large ($Re < 10^5$ to $10^6$) then laminar potential vortex flow exists.

The third flow regime is the turbulent potential vortex and is characterized by Reynolds number greater than $10^6$. In this vortex flow random eddies appear within the vortex to create turbulence.

Both laminar and turbulent vortices are characterized by a small concentrated core in which the pressure is low and axial flow is concentrated. The degree of lowering in the core pressure is related to the Reynolds number and differs with the type of vortex. Turbulent vortices produce the greatest reduction in core pressure. The greater reduction of core pressure is not due to the turbulence, but rather the high Reynolds number which allows the potential vortex structure to prevail closer into the center where velocity increases sharply and which also inevitably results in turbulence at the core. The natural tornado has a Reynolds number exceeding $10^7$ or $10^8$ and is therefore highly turbulent.

The tower structure of the invention, as will be described in greater detail below, preferably has a diameter of several hundred feet and the vortex flow produced therein will have a Reynolds number preferably greater than $10^7$ at ordinary wind speed, however laminar potential vortex flow may also be utilized.

THE TOWER STRUCTURE

Figure 2:
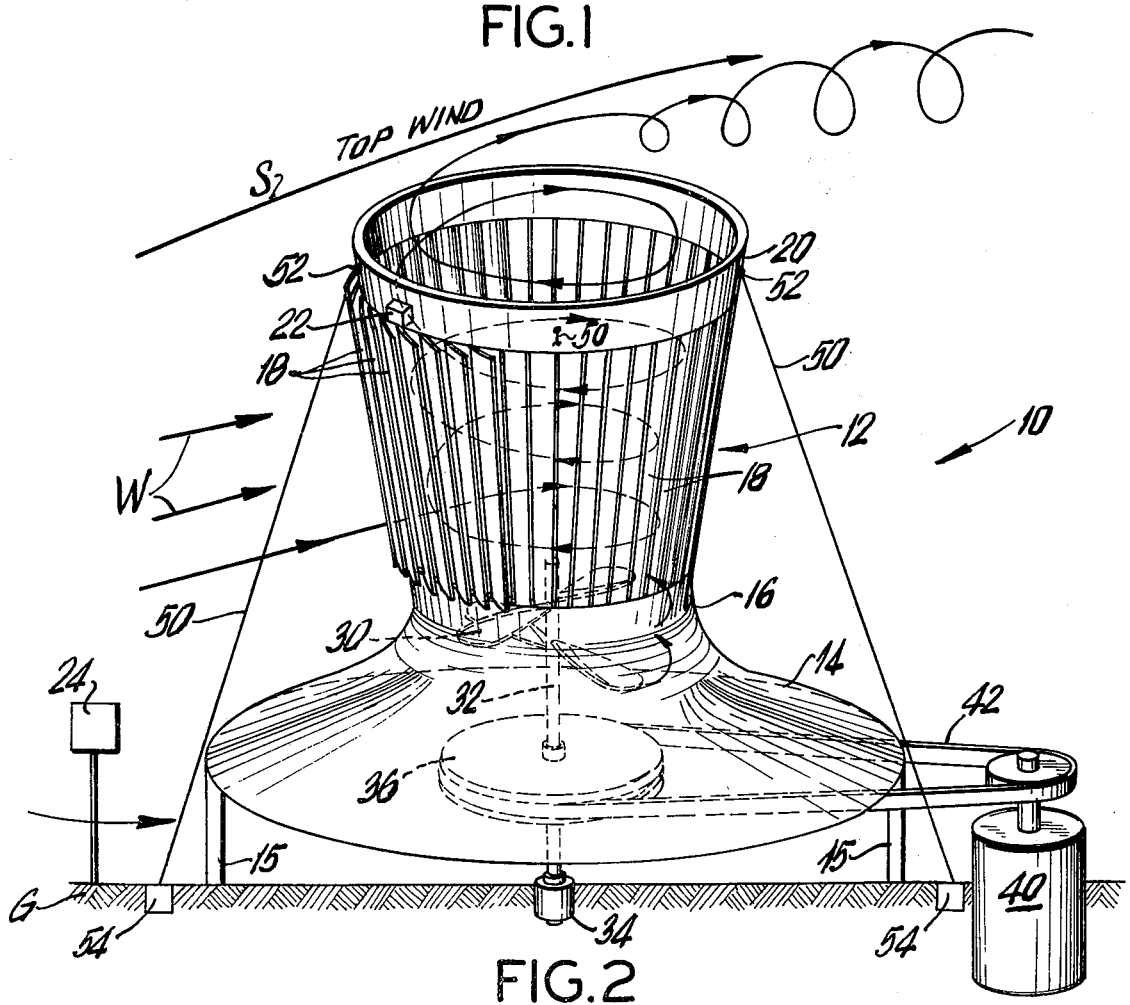
FIG. 2 is a side elevation view of the wind turbine of FIG. 1.

FIGS. 1 and 2, show a wind turbine 10 in accordance with the present invention. The apparatus includes a vertical tower structure 12 of generally hyperbolic configuration although other shapes, including cylindrical, may also be used.

Tower 12 is a stationary structure with movable vanes. With the aid of a system of cables 50, the tower is able to withstand extreme winds of hurricanes or tornadoes. Cables 50, are attached to the tower at various locations 52, and link the tower to foundations, 54 in the ground G. Sufficient number of cables are spread from the tower in various directions, so that they can absorb large stresses due to extreme winds from any direction. Tower 12 is formed by a bottom intake portion 14 which is generally bell shaped and supported at an elevated position from the ground G by struts 15. The shape of portion 14 is designed to act as a funnel to permit ambient air to be drawn into the structure from a large surrounding area and accelerated as it passes through the structure.

The intake portion 14 defines a throat 16 at its upper portion which has the minimum cross section of the tower. Extending upwardly from the intake portion is a wind inlet portion comprised of a plurality of vertical vanes 18 which circumvent and form the periphery of the tower. Each vane 18 is rotatably mounted at each end so that the vane may be operated in much the same manner as a venetian blind. The bottom end of each vane is mounted on the top of the intake portion 14 and the top end is attached to an exhaust portion 20 at the top of the tower.

By selectively opening the vanes in the direction of the wind, a vortex flow regime is introduced in the tower. To this end, each vane is independently operated by a control mechanism 22 (only one being illustrated) to open and close the vane. A wind direction sensor 24 is coupled to each control mechanism 22. Those vanes facing the wind W are opened and are preferably opened to an orientation where the vanes are tangent to the circular periphery of the tower and a 180° portion of the vanes are opened. The remaining vanes are closed and define a curved flow boundary or convolute chamber which cooperates with the tangential opened vanes to induce the incoming wind to go to a vortex flow regime.

The incoming wind W thus creates a vortex having a low pressure core which produces an upward flow to draw air from beneath and around the bottom of the tower. Preferably, a tower of the invention is at least two hundred feet in diameter at the throat and has a height in the range of 2–4 times the throat diameter.

The upward flow of air produced by the vortex is utilized to drive turbine blades 30 which are mounted to a vertical shaft 32 for rotation in a horizontal plane. Shaft 32 is supported in a ground bearing 34 and carries a combination flywheel pulley 36. Flywheel-pulley 36 stores rotational energy and drives an electrical generator 40 by means of drive belt 42.

THE TOWER FLOW REGIME

While not wishing to be restricted to any particular theory of operation, it is believed that the gross flow regime produced by this invention can best be explained by the following considerations. The wind turbine of this invention operates on a totally different principle as compared to the standard windmill type discussed above. Rather than using only kinetic energy, wind turbine 10 utilizes also the potential or pressure energy of the wind. For a wind of 15 m.p.h., the ratio of the kinetic energy to the pressure energy is about 0.03%. Thus, the potential reservoir of energy of this type is very significant.

The induced vertical air velocity in the tower will be several times the velocity of the incoming wind. Since the power output of the turbine will be proportional to the product of the volume flow rate (which depends linearly on the axial velocity) and the pressure drop available across the turbine, the power output achievable by the wind turbine will be significantly greater than that of the ordinary wind turbine.

The wind turbine 10 has significant advantages over standard windmills. The vortex created within the tower is driven by the incoming wind along substantially the entire height of the tower. Thus, there is no decay of the vortex within the tower and substantial inertia is developed to provide stability. Moreover, wind velocity generally increases with increased height above ground. Thus, the vortex strength may increase and core pressure decrease with height above the turbine blades, thus creating a favorable pressure gradient for the vortex core.

After exiting from the top of the tower, the vortex faces a rising or adverse pressure gradient because the pressure must return to atmospheric level. The vortex core may begin to break down after exit from the tower but incoming wind W passing over the top of the tower along a curved streamline S will impart energy through mixing to the exited vortex. The curved streamline of the top wind allows the vortex core to remain at a pressure lower than atmosphere for gradual breakup at a distance from the tower. Additionally, a suction or low pressure zone is created on the side of the tower where the vanes are closed. This zone further facilitates exhaust and degradation of the vortex as it exits from the tower.

Since the blades 30 of the turbine rotate in the horizontal plane near the ground and are driven by a high speed wind, e.g., 2–6 times wind speed, several major advantages can be achieved. Ultra-high speed flywheels may be used to store the energy of the turbine. Because the induced flow velocity is high, the blades may be rotated at a higher speed than standard windmills for coupling with electric generators operating at 1800 r.p.m. and higher.

With the turbine rotating horizontally, it is under a constant and uniform gravitational force, and it does not interact strongly with its supporting structure. Moreover, the fluctuations and the nonuniformities of the incoming wind may be greatly smoothened by the adjustments of the vertical vanes, and the inertia of the vortex, the flywheels, and the blades. Hence, in contrast to the standard windmill, the size of the tower structure or of the turbine of this invention is not restricted by dynamic stress loadings or instabilities. They are unlimited in size. They can be made large enough (e.g., 400 feet or more in tower diameter and 800 to 1200 feet or more in height) to capture large quantities of wind, generate in a single unit many megawatts of electricity, and be highly competitive in cost against fossil or nuclear power plants.

ALTERNATIVE EMBODIMENT

Figure 3:
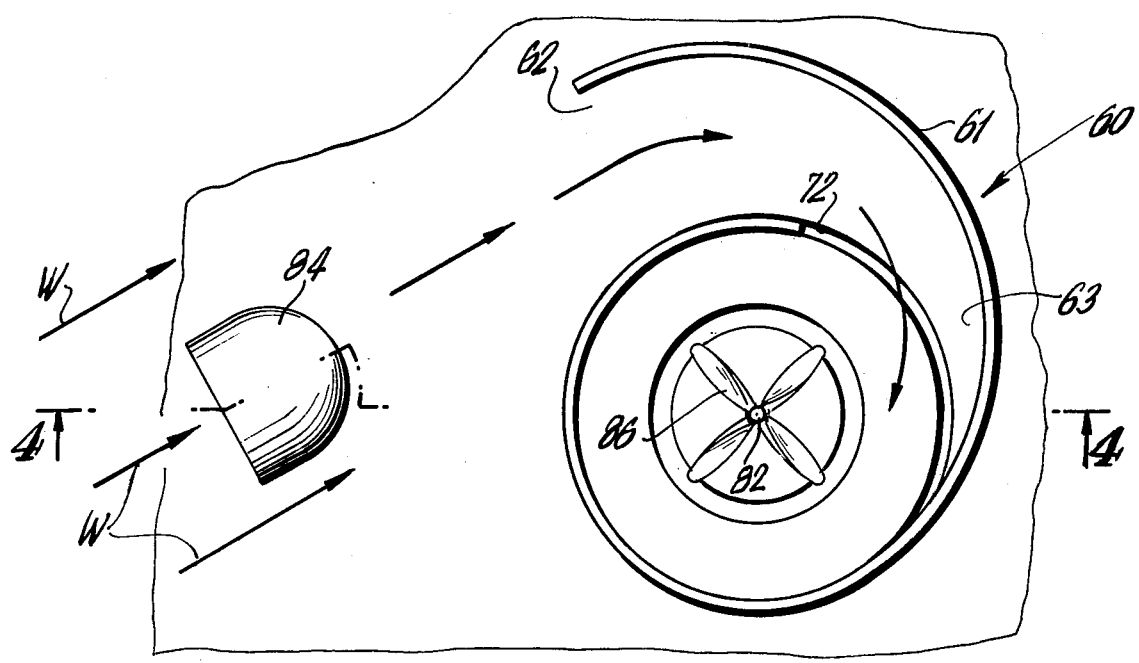
FIG. 3 shows a spiral as a possible shape of the tower structure.
Figure 4:
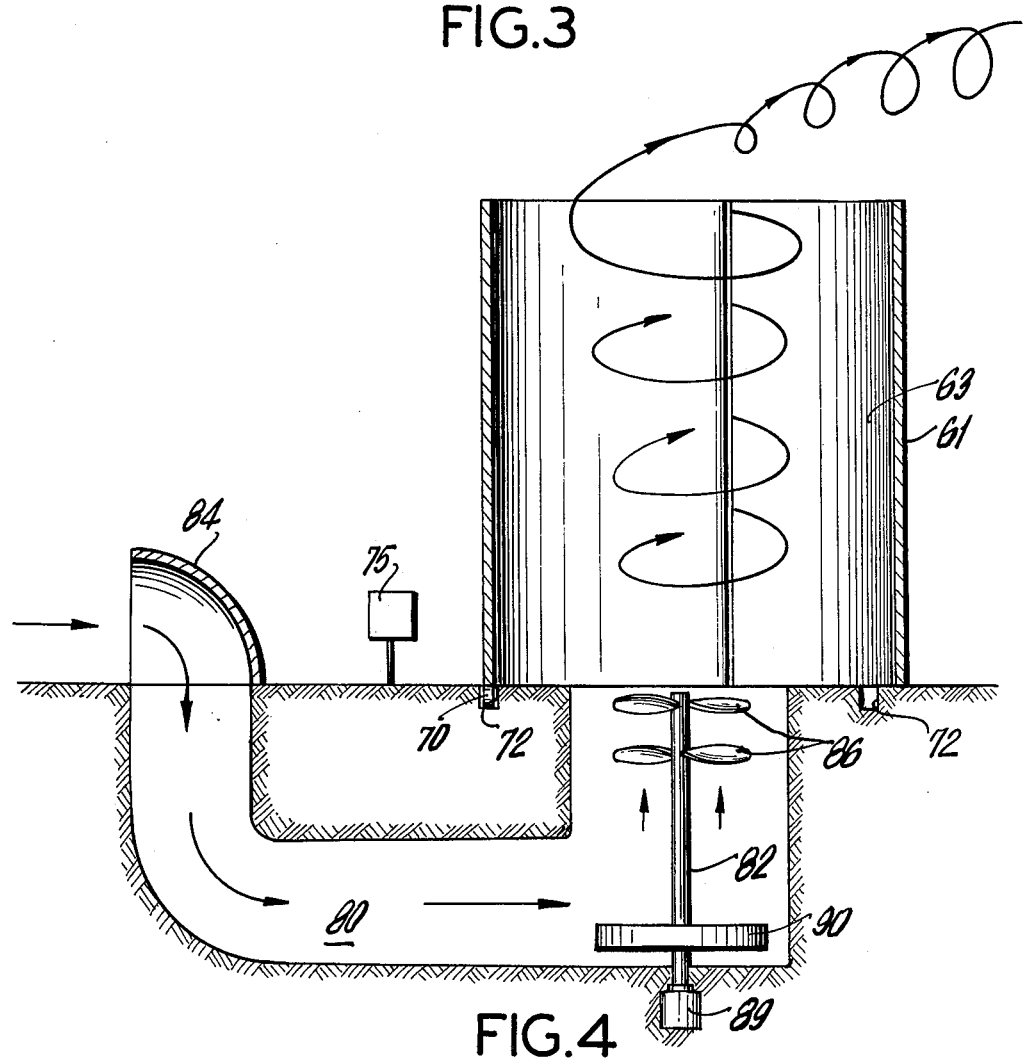
FIG. 4 shows a subterranean tunnel and a ram-air inlet for admitting ram-air to the turbine located at the bottom of the tower structure.

An alternative tower structure 60 is shown in FIG. 3 in which the tower walls 61 define a spiral cross-section in the horizontal plane. In this manner 61 provides a vertical inlet 62 for admitting wind W into the convoluted chamber 63 to induce a vortex flow regime.

Tower 60 is carried on a system of trolleys 70 at its lower end which ride in a circular track 72 corresponding to the central portion of the tower spiral. Trolleys 70 are powered by suitable means, such as electric motors or engines, and are controlled by a wind direction sensor 75. In this manner, the tower is rotated by the trolleys to position inlet 62 in an orientation tangent to wind W. It will be appreciated that in those circumstances where wind direction is generally constant, the tower may be positioned directly on the ground without provision for turning.

A subterranean tunnel 80 leading from the center of the tower to a location remote therefrom is utilized to admit driven air to the turbomachinery 82. When tunnel 80 is utilized, it is preferable to use a ram-air inlet 84 at the entrance of the tunnel. Inlet 84 has the advantage of slightly increasing the pressure head or stagnation pressure of the air by the ram effect.

Turbomachinery 82 is similar to that described above and include a set of blades 86 which are driven by the air drawn through tunnel 80 by the vortex. The blades in turn drive shaft 88, which is mounted by bearings 89 and carries a high speed flywheel 90. The power output of turbomachinery 82 is thus utilized to drive an electrical generator or other energy conversion system (not shown).

These and other modifications may be made by persons skilled in the art without departing from the scope and spirit of the present invention as pointed out in the appended claims.

WHAT IS CLAIMED IS:

1. Apparatus for generating electric power from atmospheric wind comprising: a generally tubular shaped, open ended tower structure, including means for selectively admitting wind into said tower along a substantial vertical length thereof, the interior surface of said tower defining a convolute chamber to cause said admitted wind to flow in a vortex flow regime having a low pressure core; means for permitting atmospheric air to be drawn into the bottom of said tower and accelerated by the core; turbo machine means located at the lower end of said tower structure and adapted to be driven by the air drawn in through the bottom of the tower.

2. Apparatus of claim 1 wherein said permitting means includes means for supporting the lower end of said tower structure in spaced-relationship from the ground, whereby atmospheric air is drawn in through the bottom of the tower structure.

3. Apparatus of claim 2 wherein said tower structure is generally hyperbolic in shape and having a bell shaped portion at its lower end.

4. Apparatus of claim 1 wherein said admitting means including a plurality of vertical rotatable vanes; means for sensing the direction of said atmospheric wind; and means operatively coupled to said sensing means for opening a predetermined number of said vanes in the direction of the wind while maintaining the remaining vanes in a closed position.

5. Apparatus of claim 4 wherein the predetermined number of vanes define a 180° portion of the periphery of the tower and the open vanes are oriented tangentially to said tower structure.

6. Apparatus of claim 1 wherein said flow regime is turbulent potential vortex flow regime.

7. Apparatus of claim 1 wherein said tower structure is spiral in cross-section to form a vertical inlet for admitting wind; the lower end of said structure being positioned closely adjacent to the ground; and said permitting means including means defining a subterranean tunnel extending from the center of the structure to an inlet at a location remote from the tower structure, whereby atmospheric air is drawn into the inlet and through said tunnel by the vortex in the tower to drive said turbo machine means.

8. Apparatus of claim 7 wherein said permitting means further includes ram-air means located at said tunnel inlet.

9. Apparatus of claim 7 further including means for sensing the direction of wind; and means responsive to said sensing means for rotating said tower to place the vertical inlet thereof in tangential relationship with said wind direction.

10. Apparatus for generating electric power from atmospheric wind comprising: an open ended, tower structure including a plurality of generally vertically extending vanes, said vanes forming a substantial portion of the vertical height of said tower structure; means for rotatably mounting each of said vanes; means for sensing the direction of said atmospheric wind; control means operatively coupled to said sensing means for opening the vanes facing in the direction of said wind to admit said wind into said tower, the interior surface of said tower defining a convolute chamber to cause said admitted wind to flow in a vortex flow regime having a low pressure core; means for supporting said tower in spaced relationship from ground; and turbomachine means including a generator and a turbine blade assembly adapted and arranged to rotate in a horizontal plane and drive said generator, said assembly being located within said tower adjacent the lower end thereof, said assembly being adapted to be driven by air drawn into said low pressure core.

11. Apparatus of claim 10 wherein said tower is hyperbolic in shape.

12. Apparatus of claim 10 wherein said vanes are open in tangential orientation to said tower structure.

13. Apparatus of claim 10 wherein the ratio of tower height to tower diameter is in the range of 2 to 4.

14. Apparatus of claim 13 wherein said tower diameter is at least 400 feet.

15. Apparatus of claim 10 wherein said flow regime has a Reynolds number of at least $10^6$.

* * * * *